Jan. 3, 1961   S. RAYMOND   2,967,093
APPARATUS FOR EFFECTING EXTRACTION
Filed Dec. 13, 1955   3 Sheets-Sheet 1
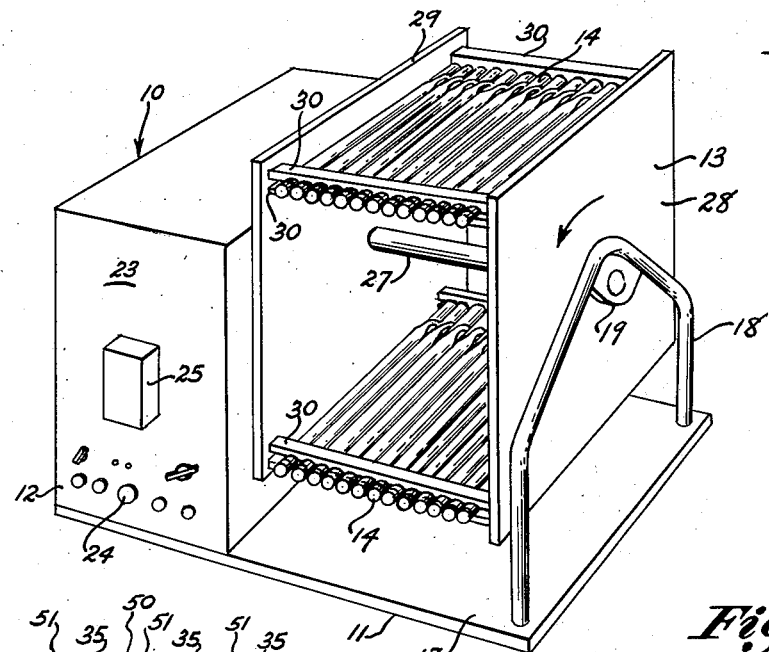
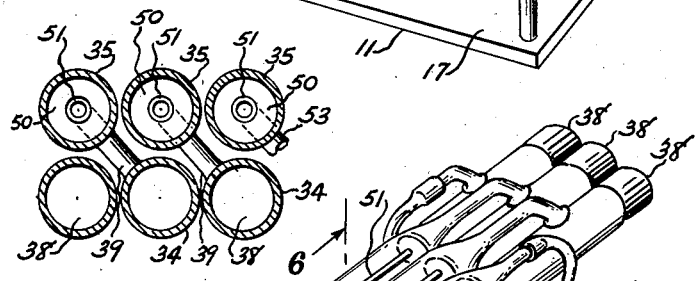

Jan. 3, 1961

S. RAYMOND 2,967,093

APPARATUS FOR EFFECTING EXTRACTION

Filed Dec. 13, 1955

INVENTOR.

Samuel Raymond

United States Patent Office 2,967,093
Patented Jan. 3, 1961

2,967,093
APPARATUS FOR EFFECTING EXTRACTION
Samuel Raymond, New York, N.Y.
(341 S. 26th St., Philadelphia 3, Pa.)
Filed Dec. 13, 1955, Ser. No. 552,906
9 Claims. (Cl. 23—270.5)

This invention relates generally to chemical apparatus, and more particularly to an improved device for mixing immiscible or partially immiscible fluids, and subsequently separating and transferring them, as well as to a method for mixing, separating and transferring immiscible liquids.

The unit process comprising mixing immiscible or partly immiscible liquids and subsequently separating one or more of them, and transferring them, is known in the art as an extraction, and is frequently required in scientific experiments and technical applications. During the process of mixing, substances dissolved in one of the phases which are readily soluble in the other of the liquids, are transferred from a solution in the first liquid to the second. Upon standing, or centrifuging, the immiscible liquids separate, so that one of the liquids may be transferred from contact with the other. That part of the liquid, which is transferred, may be called the effluent phase, and the remaining liquid, or liquids, the residual phase. Various forms of apparatus are known in the art for effecting this unit process, of which the best known is probably the separatory funnel. In the separatory funnel, the effluent and residual phases are mixed by shaking, and are separated by allowing the mixture to stand at rest under the influence of gravity, wherein the phases separate into layers according to their respective densities, so that they may be transferred by drawing off the lowermost layer, successively, through a valve or stopcock. Other types of apparatus used to accomplish the same purpose include mechanically stirred vessels and centrifugal separators. In many applications, as for example, countercurrent distribution, multiple extractions are combined in a systematic schedule so that an effluent phase from one extraction is mixed with the residual phase of another extraction. Although various schedules for combining the effluent and residual phases are used, in a typical schedule every effluent phase must be successively mixed with and subsequently separated from the first residual phase of a linear series of residual phases, and then transferred to the succeeding phase of the series, and so until each effluent phase has been extracted with every residual phase in the series. The number of separate operations required in such a schedule becomes very large when many residual and effluent phases are used. For example, if one hundred residual and one hundred effluent phases are combined according to the schedule described, the extractions must be repeated ten thousand times.

It will become evident from the description of applicant's invention as shown herein that in applicant's invention the effluent phase is the lighter or less dense liquid and the residual phase is the heavier or more dense liquid, although in other types of extraction apparatus the reverse may be true.

It is therefore an object of the present invention to provide a simple apparatus in which mixing, separating, and transferring of effluent and residual phases may be conveniently effected without the use of stopcocks or similar elements requiring separate manual manipulation.

Another object of the present invention herein lies in the provision of a device of the class described in which the cost of manufacture may be of a reasonably low order, thereby permitting relatively wide sale, distribution and use.

A further object of the invention lies in the provision of an apparatus for effecting extraction in which substantially all possibility of loss or contamination of the liquid phases has been eliminated.

A further object of the invention lies in the provision of an apparatus of the class described in which a plurality of extractions may be simultaneously effected, thereby shortening the time required to perform a series of multiple extractions.

A feature of the invention lies in the fact that extractions are effected without loss of vapor from any of the phases.

Another feature of the invention lies in the fact that the apparatus requires a minimum of space in effecting the extractions, thereby permitting use of the apparatus in laboratories of modest size.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1 is a view in perspective of an embodiment of the invention.

Figure 2 is an enlarged view in perspective, showing a plurality of mixing and separating elements, which comprise parts of the embodiment.

Figure 3 is a fragmentary side elevational view of a single mixing and separating element during a first stage of mixing of the effluent and residual phases.

Figure 4 is a fragmentary side elevational view of the mixing and separating element during a separating stage, in which the effluent phase rises to become disposed above the residual phase.

Figure 5 is a fragmentary elevational view of a single mixing and separating element showing a third stage of operation in which the effluent phase is drained therefrom leaving the residual phase intact.

Figure 6 is an enlarged fragmentary vertical sectional view as seen from the plane 6—6 on Figure 3.

Figure 7A:
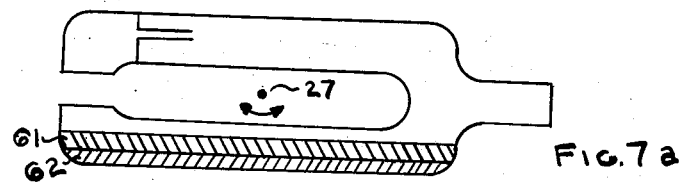
Figures 7a and 7e are schematic illustrations of the various manipulative operations involved in mixing and separating the effluent phase from the residual phase.

In accordance with the invention, the device, generally indicated by reference character 10, comprises broadly: a fixed support element 11, rotating means 12, a rotary frame element 13, and a plurality of mixing and separating elements 14.

The fixed support element 11 includes a horizontally disposed base member 17 and a vertically disposed frame member 18 having bearing means 19 disposed thereon, whereby the element 13 is partially supported for rotation about a substantially horizontally disposed axis.

The rotating means 12 includes a casing element 23 from which project a plurality of controls 24. Counter-means 25 records the number of complete revolutions executed by the element 13, and disposed within the casing element 23 is a prime mover and suitable gearing for obtaining rotational movement of the element 13, the details of which form no part of the present disclosure.

The rotary frame element 13 includes an axle member 27 adapted to cooperate with the bearing means 19, and a pair of rectangularly-shaped end plate members 28 and 29 mounted thereupon. A pair of elongated supporting member 30 are positioned substantially at each of the corners of the plate members 28 and 29 in such manner that the mixing and separating elements 14 may be slidably inserted therebetween to be supported thereby. If desired, foam rubber or other cushioning means may be inserted between the members 30, and the elements 14 to protect the latter from damage.

The mixing and separating elements 14 are substantially similar, and accordingly, a detailed description of one of such elements will suffice for all. Referring to Figures 2-6, inclusive, each of the elements 14 includes a first or phase mixing tube 34, and a second or phase separating tube 35 interconnected at one end by a bifurcated juncture member 36. In line with considerations of compactness and the desirability of adjacent positioning of a large number of mixing and separating elements 14, the tubes 34 and 35 are of elongated configuration, and are disposed with the principal axes thereof in parallel relationship. Where desired, the tubes 34 and 35 may be formed as a continuous spiral (not shown).

The phase mixing tube 34 includes a closed end 37 forming a mixing reservoir, which may be provided with a threaded cap member 38 for draining purposes. An effluent phase entrance tube 39 connects to the lumen of the tube 34, and as may be seen on Figure 2, the tube 39 is adapted to receive the effluent phase of an adjacent element 14, when the elements are disposed in vertical position. The main body portion 40 of the tube 34 is preferably rectilinear, the open end portion 41 sloping slightly upward, as seen on Figure 3, to lead to the juncture member 36. The member 36 may also be provided with a second cap member 42 to facilitate draining of the element 14, or the cap 38 may be employed for all draining operations.

The phase separating tube 35 is generally shorter in over-all length than the mixing tube 34, and is provided with an open end portion 46, a main body portion 47, and a closed end portion 48 forming a residual phase retaining reservoir 49. The reservoir 49 is defined by a septum 50 disposed at right angles to the principal axis of the tube 35, a downspout member 51 being connected within an opening 52 in the septum leading to a drain tube 53, which in turn connects with the effluent phase entrance tube 39 of an adjacent mixing and separating element 14. As best seen on Figure 6, the inlet opening 53 of the downspout member 52 is disposed concentrically with respect to the principal axis of the tube 35. This positioning results in the retention of a constant volume of the residual phase irrespective of the angle of the tube 35 during the draining of the effluent phase. The downspout member 52 need not be coaxially positioned, as the location of the opening 53 with respect to the principal axis of the tube 35 is the determinative factor. The downspout member 52 is of any desired length, but must be less than substantially one-half of the effective length of the tube 35 in order that only the effluent phase be drained. Where the interconnected tube elements 14 are disposed at some distance, a flexible tube 59 may be employed for this purpose.

Operation

An operating cycle of the device consists of the steps of filling each of the mixing and separating elements 14 with a predetermined amount of the residual phase, the volume of which is equal to that volume which will be trapped between the downspout element 51, the septum 50, and the inner surfaces of the tube 35, and which may be referred to as the critical volume; following which a quantity of the effluent phase is introduced through the tube; following which the phases are mixed and allowed to separate, whereby the effluent stage may be drained from the elements 14.

The elements 14 are preferably loaded while in the positions shown on Figures 2 and 3, wherein the residual phase reservoir 49 is disposed upwardly. A volume of the residual phase equal to the critical volume is then introduced by removing the caps 38 or 42, and allowing the liquid to pass through the openings disposed thereunder. In the alternative, a large quantity of the residual phase may be introduced in the first of the elements 14, and the elements rotated about an axis perpendicular to the principal axis thereof for as many times as there are elements 14 in interconnected series. As will become more clearly apparent, this action will result in depositing the critical amount of the residual phase within each of the elements 14, while draining the excess thereof from the last element 14.

The effluent phase is then introduced into the tubes, in any desired quantity, limited by the capacity of the mixing tube 34, in a similar manner. In the operation of a series of mixing and separating elements, it is preferable to add to the first element at the end of each extraction cycle, another volume of effluent phase before beginning the next repetition of the extraction cycle. In this way, the separate effluent phases added, travel simultaneously and in sequence through the series of elements 14, the number of effluent phases which may be simultaneously extracted being limited only by the number of elements in the series.

As may be seen on Figure 1, it is possible to mount several series of elements 14 upon the rotary frame element, so that several series of operations may be conducted at the same time, or the series may be interconnected to allow a greater number of elements 14 in a single series.

Referring to Figures 3, 4 and 5, the extraction cycle commences with the individual elements 14 disposed with the residual reservoir 49 positioned above the mixing tube 34. The element 14 is then gently rocked about the axis of rotation so as to thoroughly mix the effluent and residual phases. The frame element 13 is next rotated through substantially 180 degrees to bring the mixing and separating elements 14 to the position shown on Figure 4 wherein the contents consisting of intermixed effluent and residual phases are allowed to flow to the separating tube 35. In this position, the volume of the intermixed phases is spread over a relatively large area, and rapid separation follows. As may be observed on Figure 4, a small quantity of the liquid may rise to enter the downspout member 51, but since this liquid consists substantially entirely of the effluent phase, none of the residual phase will eventually be drained. Following the separation of the phases, the frame element is again rotated through an additional 90 degrees wherein the individual elements 14 are brought to a vertical position, as shown on Figure 5. In this position, the critical volume of the residual phase is trapped within the reservoir 49, and the separated effluent phase flows under the action of gravity through the downspout member 51 to the drain tube 53. As the drain tube 53 is connected to an effluent phase entrance 39, the effluent phase is deposited within the adjacent element 14 so that on the next cycle the second extraction may be preformed.

Figure 7B:
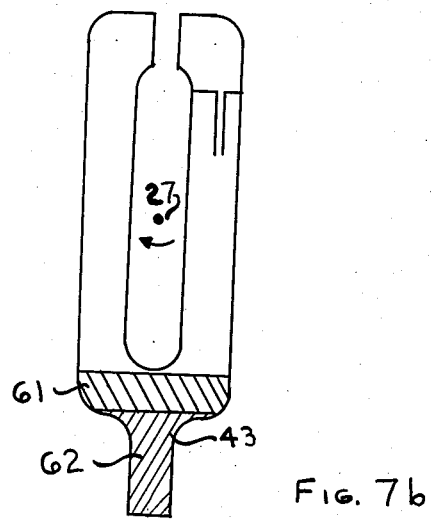
Figure 7C:
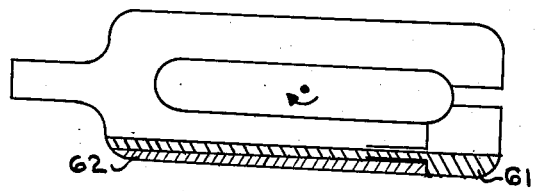
Figure 7D:
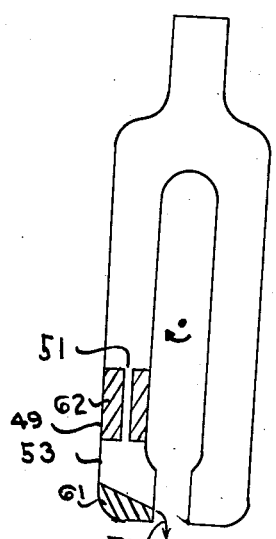
Figure 7E:
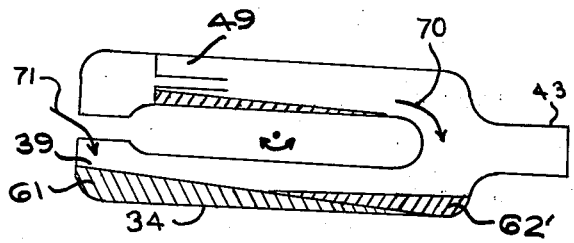

Figures 7a through 7e further show the manipulative steps described above in a schematic manner. Figures 7a through 7d show the steps of first mixing and separating in an element 14 containing an effluent phase 61 and a residual phase 62, while Figure 7e shows the outline of a second mixing and separating element 14. In these drawings only the bare outline is schematically shown for clarity but the various components are numbered to correspond with the components illustrated in Figures 3–5. Figure 7a illustrates the mixing operation in which mxing of the two phases is effected by oscillation about the axis 27 as indicated by the arrow. This corresponds to the position of Figure 3. After adequate mixing the element 14 is rotated in the direction shown in Figure 7b, and the two phases flow together through the juncture member 43 as illustrated in Figure 7b. When the position illustrated in Figure 7c is reached (corresponding to Figure 4), the rotation is stopped. In this position the effluent phase 61 layers out above the residual phase 62 as shown. When this layering has been effected, further rotation to the position of Fig. 7d (corresponding to Figure 5) brings about the discharge of the effluent phase 61 through the downspout 51 and the drain tube 53 while the residual phase 62 remains trapped in reservoir 49. Now, if the drain tube 53 of the first element 14 is connected to the effluent phase entrance tube 39 of the second element 14, the effluent phase 61 will flow into the mixing tube 34 of the second element as shown by arrows 71 and 72, Figures 7e and 7d. Further rotation to the position illustrated in Fig. 7e will cause the residual phase of the second element 14 to flow into the mixing tube 34 of the second element as shown by arrow 70. The elements are then oscillated as before to mix the effluent phase 61 with the new residual phase of the second element 14.

Figure 8:
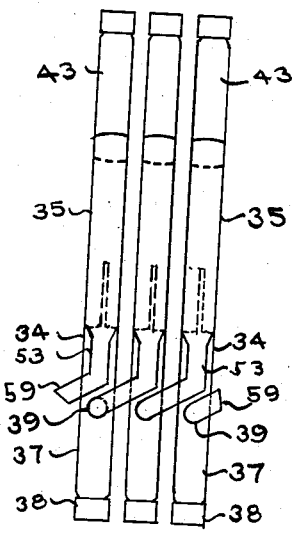
Figure 8 is a schematic illustration of the manner of interconnection of the individual mixing and separating elements.

The manner of interconnecting the individual elements 14 is clearly evident from Figure 8, which is essentially the same as Figure 2 in a plan view. Figure 8 shows clearly how each drain tube 53 is connected to the entrance tube 39 of the following element 14 of the series as described above.

As may be seen on Figure 2, the effluent phase from the last eleemnt 14 of the series may be transferred to the first element of the series through a flexible hose 59, or other suitable means so that each of the effluent phases may be passed through each of the residual phases in the element 14 of the series.

When the series of extractions has been completed, the elements 14 may be left in a vertical position and the caps 38 removed to permit the draining of the effluent phases. Upon the completion of this operation, the elements 14 may be rotated through substantially 360 degrees in a reverse direction to remove the residual phases in a similar manner.

It may thus be seen that I have invented novel and highly useful improvements in an apparatus for effecting extraction between immiscible or partially immiscible liquids in which provision is made for the making of a large number of extractions with a minimum of effort upon the part of the operator. By coupling a number of individual mixing and separating elements, it is possible to deposit the effluent phase of one extraction to be mixed with the residual phase of an adjacent mixing and separating element, so that an entire series of extractions results by merely rotating the separating elements as a group about a common axis of rotation. The device requires only the ordinary skill in the art to which the invention relates, and by providing automatic means for imparting orbital motion to the elements, the operation of the cycle is substantially automatic.

I wish it to be understood that I do not consider the invention limited to the exact details of structure shown and set forth in this specification, for obvious modifications will occur to those skilled in the art to which the present invention pertains.

I claim:

1. A mixing and separating element comprising: means for mixing effluent and residual phase of immiscible liquids in predetermined quantities, a phase separating tube separate from said mixing means, the phase separating tube having at least one closed end and a phase entrance opening positioned away from the closed end, means for introducing the mixed fluids from the mixing means into the phase entrance opening of the phase separating tube, a draining downspout extending through the closed end of the phase separating tube and extending longitudinally into the phase separating tube an effective distance substantially less than one half the distance from the closed end of the tube to the phase entrance opening therein, the downspout inlet having a small opening positioned coaxially within the phase mixing tube, the cubic volume defined between the phase separating tube and downspout between the closed end of the phase separating tube and the inlet end of the downspout being substantially equal to the cubic volume of the residual phase of the liquid, whereby when the mixed liquids are passed into the phase separating tube they may be allowed to separate while the phase separating tube is substantially horizontal and upon moving the phase separating tube until the downspout is substantially vertical the effluent phase is allowed to drain out through the downspout.

2. An apparatus for mixing and separating including a plurality of mixing and separating elements as defined in claim 1 and further comprising means positioning said elements side by side in parallel relationship, and a plurality of tubular members, each tubular member connecting an outlet opening of the downspout of one element with the means for mixing effluent and residual phase of immiscible liquids of another element, so that the effluent which drains from the downspout of one element may be passed into another element for mixing with another residual phase for another operation of separating.

3. A mixing and separating element comprising; a phase mixing tube having one closed end for mixing effluent and residual phases of immiscible liquids, a phase separating tube having one closed end, a juncture member rigidly connecting said tubes and forming a means of liquid communication between an open end of the phase mixing tube and an open end of the phase separating tube, a downspout having a small inlet opening coaxially positioned within the phase separating tube, the downspout extending through the closed end of the phase separating tube and having an effective length extending into the phase separating tube of substantially less than one half the length of the phase separating tube from the closed end thereof to the end connected to the juncture member, the cubic volume defined by the space between the phase separating tube and downspout and between the closed end of the phase separating tube and the inlet end of the downspout being substantially equal to the cubic volume of the residual phase of the mixed liquids, so that when the mixed liquids are passed into the phase mixing tube and allowed to separate while the phase mixing tube is substantially horizontal, the effluent phase will drain out through the downspout when the phase mixing tube is positioned substantially vertical with the inlet end of the downspout extending substantially vertically upward.

4. A mixing and spearating element as defined in claim 3 wherein the juncture member comprises a hollow reservoir having a bifurcated shape with a non-bifurcated tubular portion directed away from the juncture of said tube and the juncture member.

5. An apparatus for mixing and separating including a plurality of mixing and separating elements as defined in claim 3 and further comprising means portioning said elements side by side in parallel relationship, and a tubular member connecting an outlet opening of the downspout of one element with the phase mixing tube of another element, so that the effluent which drains from the downspout of one element may be passed into another element for mixing with another residual phase for another operation of separating.

6. An apparatus for mixing and separating including a plurality of mixing and separating elements as defined in claim 4 and further comprising means positioning said elements side by side in parallel relationship, and a tubular member connecting an outlet opening of the downspout of one element with the phase mixing tube of another element, so that the effluent which drains from the downspout of one element may be passed into another element for mixing with another residual phase for another operation of separating.

7. A machine for mixing and separating effluent and residual phases of immiscible liquids, the machine including an apparatus as defined in claim 2 and further comprising, a frame for rigidly supporting all the elements of the apparatus, a rotatable member operatively connected to said frame to rotate the same such that the parallel mixing and separating elements of the apparatus will always be at substantially right angles to the axis of rotation of the rotatable member, a stationary support base for supporting the rotatable member, and means for imparting controlled rotation to the rotatable member about the axis thereof.

8. A machine for mixing and separating effluent and residual phases of immiscible liquids, the machine including an apparatus as defined in claim 5 and further comprising, a frame for rigidly supporting all the elements of the apparatus, a rotatable member operatively connected to said frame to rotate the same such that the parallel mixing and separating elements of the apparatus will always be at substantially right angles to the axis of rotation of the rotatable member, a stationary support base for supporting the rotatable member, and means for imparting controlled rotation to the rotatable member about the axis thereof.

9. A machine for mixing and separating effluent and residual phases of immiscible liquids, the machine including an apparatus as defined in claim 6 and further comprising, a frame for rigidly supporting all the elements of the apparatus, a rotatable member operatively connected to said frame to rotate the same such that the parallel mixing and separating elements of the apparatus will always be at substantially right angles to the axis of rotation of the rotatable member, a stationary support base for supporting the rotatable member, and means for imparting controlled rotation to the rotatable member about the axis thereof.

References Cited in the file of this patent

UNITED STATES PATENTS

| 230,960 | Mott | Aug. 10, 1880 |
| 1,973,755 | Geyer | Sept. 18, 1934 |
| 2,089,796 | Hopf | Aug. 10, 1937 |
| 2,580,010 | Fenske et al. | Dec. 25, 1951 |

FOREIGN PATENTS

| 355,615 | Great Britain | Aug. 27, 1931 |

OTHER REFERENCES

Wilhelm and Foos: A Countercurrent Liquid-liquid Extractor, U.S. Atomic Energy Commission, Sept. 8, 1955, Iowa State College, Report 458.